March 18, 1952.  R. B. COTTRELL  2,589,781
PIN RETAINING MEANS
Filed April 3, 1948
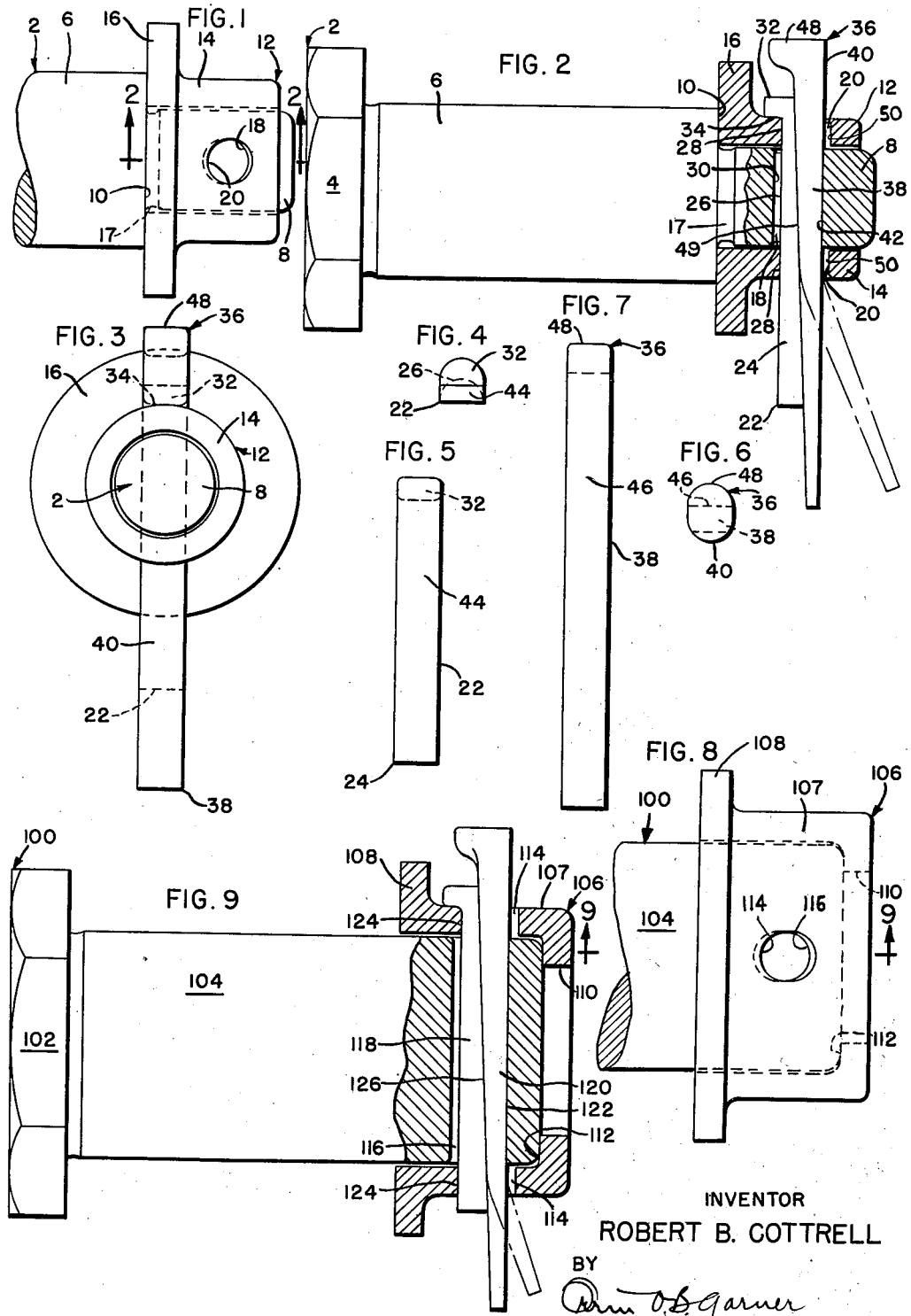
INVENTOR
ROBERT B. COTTRELL
BY
ATTORNEY Patented Mar. 18, 1952

2,589,781

UNITED STATES PATENT OFFICE 2,589,781

PIN RETAINING MEANS

Robert B. Cottrell, Chicago, Ill., assignor to American Steel Foundries, Chicago, Ill., a corporation of New Jersey Application April 3, 1948, Serial No. 18,740

1 Claim. (Cl. 85—7)

This invention relates to fastening means and more particularly to a type adapted for use in conjunction with an element such as a pin or stud.

My device is particularly useful for railway service, although not restricted thereto, where parts are subjected to continuous severe vibrations. My device may be used as, for example, on a pin connecting several brake elements. Heretofore such fastenings employed a pin with a thread, a nut and a cotter key which is expensive and not fully tight or utilized a washer sleeved on the pin and retained thereon by a cotter key. This latter assembly is loose fitting and under vibration is extremely noisy and due to the movement of the parts during such vibration has a relatively short life.

One object of the invention is to provide simple, efficient fastening means which are easy to apply and assemble in tight engagement with an associated element of the type described.

A different object of the invention is to design a fastening means which may be applied or removed without the use of any special tools.

A further object of the invention is to design a fastening which will lock positively and not work loose.

Another object of the invention is to provide a fastening means in which certain parts are formed to engage each other along complementary curved surfaces which add to the immobility of these parts relative to each other and thus insure tightness in the device.

These and other objects of the invention will become more apparent from the specification and the drawings wherein:

Figure 1 is a fragmentary plan view of one embodiment of the invention with the securing means removed;

Figure 2 is a side elevational view partly in section substantially on the line 2—2 of Figure 1;

Figure 3 is an end view of Figure 2 taken from the right thereof;

Figures 4 and 5 are top and inner side views, respectively, of the wedge member;

Figures 6 and 7 are top and inner side views, respectively, of the taper key;

Figure 8 is a view comparable to Figure 1, illustrating a modification of the invention; and Figure 9 is a side elevational view partly in section on the line 9—9 of Figure 8.

Describing the invention in detail and referring first to Figures 1 to 7, inclusive, the structure illustrated therein comprises a fastener element in the form of a pin 2 having a head 4 and a cylindrical shank 6. The shank has a reduced cylindrical portion 8 at the extremity remote from the head and at the inner end of the reduced portion 8 presents a shoulder 10.

A retainer element in the form of a flange washer 12 is mounted on the portion 8, said flange washer 12 comprising a sleeve 14 surrounding the portion 8 and in abutment at its inner end with the before-mentioned shoulder 10 along a surface extending transversely of said pin 2. The sleeve 14 is formed at its inner end with an out-turned annular flange 16 of a diameter greater than that of the shank, the flange 16 and head 4 cooperating with each other to maintain the pin in assembled relation with parts (not shown). The inner end of portion 8 is preferably provided with an annular groove 17 to prevent binding between the washer and portion 8 and thus insure flat face abutment between the inner edge of the sleeve 14 and shoulder 10.

The retainer element 12 is secured to portion 8 of shank 6 and is urged tightly against shoulder 10 by means of a fastener assembly or securing means extending through partially registered transverse openings 18 and 20 in portion 8 and sleeve 14, respectively.

It will be noted that the openings 20 in the sleeve are in alignment with each other and circular in form; however, they may be elliptical or of any other suitable, though preferably curved, configuration, as will be readily understood by those skilled in the art. The opening 18 in portion 8 is, of course, of the same contour as openings 20 and is misaligned or slightly offset inwardly or in the direction toward the shoulder 10 with respect to openings 20, 20 in the assembled position of the parts, as clearly shown in the drawings.

The fastener assembly comprises a wedge element or gib 22 having a body portion 24 extending through the openings 18 and 20. The body portion 24 has an outer surface 26 of a form complementary to the contour of the openings, said surface 26 bearing at spaced points as at 28, 28 against the portions of sleeve 14 defining the inboard sides of openings 20, 20 but being spaced as at 30 from the inner side of opening 20. The wedge element has a stop or retainer lug 32 at one end extending normal to the plane of the body portion 24 and overlapping sleeve 14 in the direction toward flange 16 and seating against the outer surface of sleeve 14 as at 34. It will be readily seen that the lug 32 holds the wedge member in position in the openings.

The fastener assembly also includes a taper key or wedge 36 having a shank portion 38 extending through openings 18 and 20, said shank portion 38 having an outer surface 40 in complementary engagement as at 42 with portion 8 in the opening 20 therein at the side of said opening adjacent the outer end of portion 8.

The body portion 24 of the wedge element 22 and the shank portion 38 of key 36 are provided on their inner sides with diagonal reversely arranged complemental wedge faces 44 and 46, respectively, engaging each other as at 49.

In assembling the structure, the flange washer 12 is positioned on portion 8 of the pin 2, as shown in the drawings, with the inner edge of the sleeve 14 of the washer in abutment with shoulder 10 and with the openings 18 and 20, partially registered. The wedge member body portion 24 is inserted into these openings, thick end first, and moved through the openings until the lug 32, which is at the narrow end of the body portion, seats, as heretofore explained, against the sleeve 14. The narrow end of the taper key is inserted into the openings from the same end as the wedge element with the wedge surface 46 thereof engaging the surface 44 of the wedge element 22. The key and wedge element are positioned so that the surfaces 44 and 46 extend transversely of the shank 6 and thus portion 8 thereof. The outer surface 40 of the key engages portion 8 as described and is spaced as at 50, 50 from the margins of openings 20, 20. The wedge element, as previously stated, engages the sleeve at 28, 28 and is spaced as at 30 from that side of opening 20 which is adjacent the inner end of portion 8. To seat the inner end of washer 12 tightly against the shoulder 10 to prevent rattling between the washer and pin, there being a loose fit between sleeve 14 and portion 8 due to manufacturing tolerances, the key is hammered on head 48 provided on the thick end of the key and which is in the form of a flange extending over lug 30 on wedge element 22. Such hammering causes the wedge and key to advance toward each other and the wedge to bear tightly against the washer at the points stated (the wedge being prevented from falling out of position by lug 32) and urges the inner end of the sleeve into tight frictional engagement with the shoulder 10. The wedge and key are also in tight engagement with each other and the key tightly engages portion 8. Thereafter, to insure against accidental separation of the key and wedge element, the narrow end of the key may be bent as shown in phantom lines in Figure 2.

The assembly requires no special tool and effects a tight connection between the washer and the pin. The wedge cannot move out of the openings because of lug 32 and the taper of the wedge surface, and the key cannot fall out of position because of the taper and the bent narrow extremity. Furthermore, inasmuch as the outer surfaces of the key and wedge element are curved and in complementary engagement with the curved margins of the openings, the key and wedge element are prevented from turning in the openings under vibration or sliding against each other on their engaging faces to work themselves loose.

Referring now to Figures 8 and 9, illustrating a modification of the invention, the pin 100 comprises a head 102 and a shank 104. A retainer element is sleeved on the end of the shank remote from the head, said element being in the form of a flange washer 106 comprising a sleeve 107 surrounding the shank. The inner end of the sleeve is provided with an outturned flange 108 and the outer end of the sleeve is provided with a shoulder in the form of an inturned annular flange 110 in abutment as at 112 with the adjacent end of the shank. The sleeve is provided with aligned transverse openings 114, 114 (herein shown as elliptical), partially registered with a similarly contoured transverse opening 116 in the adjacent end of the shank.

A fastener assembly or securing means is employed to hold the washer on the shank and is identical with that previously described and includes a wedge element or gib 118 and a taper key or wedge 120, both of which extend through the openings 114 and 116, the key bearing against the shank as at 122 and the wedge element against spaced portions of the sleeve as at 124, 124. The key and wedge element engage each other along complementary wedge surfaces as at 126 and when tightly wedged with one another tend to move the washer axially inwardly of the shank and thus draw or urge the flange 110 of said washer into tight frictional engagement with the end of the shank.

The only difference between these two embodiments is that in one the shoulder is formed on the shank and in the other the shoulder is on the washer.

It will be appreciated that the arrangement described is of simple design, is easy to apply and affords a tight connection between the various parts. It will be understood that in the first described modification the shank 6 of the pin may be any selected diameter not less than the diameter of portion 8 nor greater than the diameter of flange 16. However, in the second embodiment the pin is of uniform diameter and of much simpler design than that illustrated in the first embodiment.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claim.

I claim:

In a fastening assembly, the combination of a pin having a shank with a head at one end, a retaining element mounted on the other end of the shank comprising a sleeve surrounding the shank, an inturned flange on one end of the sleeve disposed outboardly of the other end of the shank and in abutment with said other end thereof, an outturned flange on the other end of the sleeve, said shank and sleeve having elliptical openings extending transversely of the shank and arranged with their major axes extending longitudinally of the shank, the openings in the sleeve being offset outboardly from the opening in the shank, and means securing said retainer element to the shank and urging said shank and retainer element in opposite directions to engage said inturned flange with said other end of the shank, said means comprising a wedge key and a gib extending through said openings in the sleeve and shank and arranged side by side axially of the shank, said gib being disposed inboardly of said key with respect to said other end of said shank, said key and gib being tapered lengthwise thereof in reverse directions and engaging each other at adjacent sides along substantially flat complementary wedge surfaces extending diagonally with respect to the longitudinal axis of the shank, a head on said gib at its smaller end, said head bearing against the exterior of said sleeve and being entirely disposed radially inwardly of said outturned flange with respect to the longitudinal axis of the shank, said key and gib being elliptical in cross section with the major cross sectional axes thereof extending longitudinally of the shank, said key having an uninterrupted elliptical surface extending from end to end thereof and bearing against a complementary surface of the shank defining the outboard margin of its opening, and said gib having an uninterrupted elliptical surface extending from said head to the larger end of said gib and bearing against complementary surfaces of the sleeve defining the inboard margins of its openings, the smaller end of said key being bendable to interlock the key against accidental disassembly thereof from said openings.

ROBERT B. COTTRELL.

REFERENCES CITED

The following references are of record in the file of this patent:

UNITED STATES PATENTS

| Number | Name | Date |
|---|---|---|
| 849,952 | Willis | Apr. 9, 1907 |
| 1,023,985 | Beaulieu | Apr. 23, 1912 |
| 1,114,525 | Rider | Oct. 20, 1914 |
| 1,152,749 | Mullaney | Sept. 7, 1915 |
| 1,737,091 | Northey | Nov. 26, 1929 |
| 2,172,976 | Johnson | Sept. 12, 1939 |